(12) United States Patent
Miyamae (10) Patent No.: US 8,493,050 B2
(45) Date of Patent: Jul. 23, 2013

(54) CONTROL CIRCUIT FOR SWITCHING POWER SUPPLY UNIT, ELECTRONIC DEVICE AND METHOD FOR CONTROLLING SWITCHING POWER SUPPLY UNIT

(75) Inventor: Toru Miyamae, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 357 days.

(21) Appl. No.: 12/954,756

(22) Filed: Nov. 26, 2010

(65) Prior Publication Data

US 2011/0127981 A1   Jun. 2, 2011

(30) Foreign Application Priority Data

Nov. 27, 2009   (JP) ................... 2009-270328

(51) Int. Cl.
*G05F 1/575*  (2006.01)
(52) U.S. Cl.
USPC .......................................... 323/298; 323/284
(58) Field of Classification Search
USPC ................. 323/298, 224–226, 233, 284
See application file for complete search history.

(56) References Cited

U.S. PATENT DOCUMENTS

| | | | | |
|---|---|---|---|---|
| 5,592,074 A * | 1/1997 | Takehara | ................... | 363/131 |
| 6,452,367 B2 * | 9/2002 | Watanabe | ................... | 323/267 |
| 7,158,391 B2 * | 1/2007 | Hatakeyama | ............ | 363/21.01 |
| 7,221,129 B2 * | 5/2007 | Matsuo et al. | ............ | 323/222 |
| 7,746,049 B2 | 6/2010 | Sato | | |

FOREIGN PATENT DOCUMENTS

JP    2008-253051 A    10/2008

* cited by examiner

*Primary Examiner* — Harry Behm
(74) *Attorney, Agent, or Firm* — Fujitsu Patent Center (57) ABSTRACT

A control circuit which switches a power supply circuit includes: a first control circuit to suspend a switching operation based on an output voltage of the switching power supply circuit; and a second control circuit to change a magnitude of a first load coupled to an output of the switching power supply circuit based on a suspension period of the switching operation, wherein the second control circuit changes the magnitude of the first load in a first suspension period based on a second load, which is updated in a second suspension period prior to the first suspension period.

12 Claims, 7 Drawing Sheets

CONTROL CIRCUIT FOR SWITCHING POWER SUPPLY UNIT, ELECTRONIC DEVICE AND METHOD FOR CONTROLLING SWITCHING POWER SUPPLY UNIT

CROSS-REFERENCE TO RELATED APPLICATIONS

This application is based upon and claims the benefit of priority of the prior Japanese Patent Application No. 2009-270328 filed on Nov. 27, 2009, the entire contents of which are incorporated herein by reference.

BACKGROUND

1. Field

Embodiments discussed herein relate to a control circuit for a switching power supply circuit.

2. Description of Related Art

A switching power supply circuit that supplies a load with power, for example, a DC-DC converter that converts a DC voltage into another DC voltage, is provided in an electronic device, etc.

A related art is disclosed in Japanese Laid-open Patent Publication No. 2008-253051, etc.

SUMMARY

According to one aspect of the embodiments, a control circuit which switches a power supply circuit includes: a first control circuit to suspend a switching operation based on an output voltage of the switching power supply circuit; and a second control circuit to change a magnitude of a first load coupled to an output of the switching power supply circuit based on a suspension period of the switching operation, wherein the second control circuit changes the magnitude of the first load in a first suspension period based on a second load that is updated in a second suspension period prior to the first suspension period.

Additional advantages and novel features of the invention will be set forth in part in the description that follows, and in part will become more apparent to those skilled in the art upon examination of the following or upon learning by practice of the invention.

DESCRIPTION OF EMBODIMENTS

A DC-DC converter may have a PFM function for suspending and performing a switching operation if an output voltage increases and decreases, respectively. Because a period for outputting the decreased output voltage is determined by an output capacitor and a load current, the switching operation is suspended for a longer period of time as the load is reduced. In order to decrease the output voltage in case of a light load, a switching element provided between the output and ground is kept on for a predetermined period of time so that any electric charge stored in the output capacitor is discharged.

When, for example, the switching operation is suspended for a period of time longer than a predetermined time period in case of a light load, the switching element is turned on. The decrease of the output voltage for a period of time until the switching element is turned on is determined by the output capacitor and the load current. A ripple waveform of the output voltage may include a low frequency component depending upon the output capacitor and the load current in the period of time until the switching element is turned on.

Figure 1:
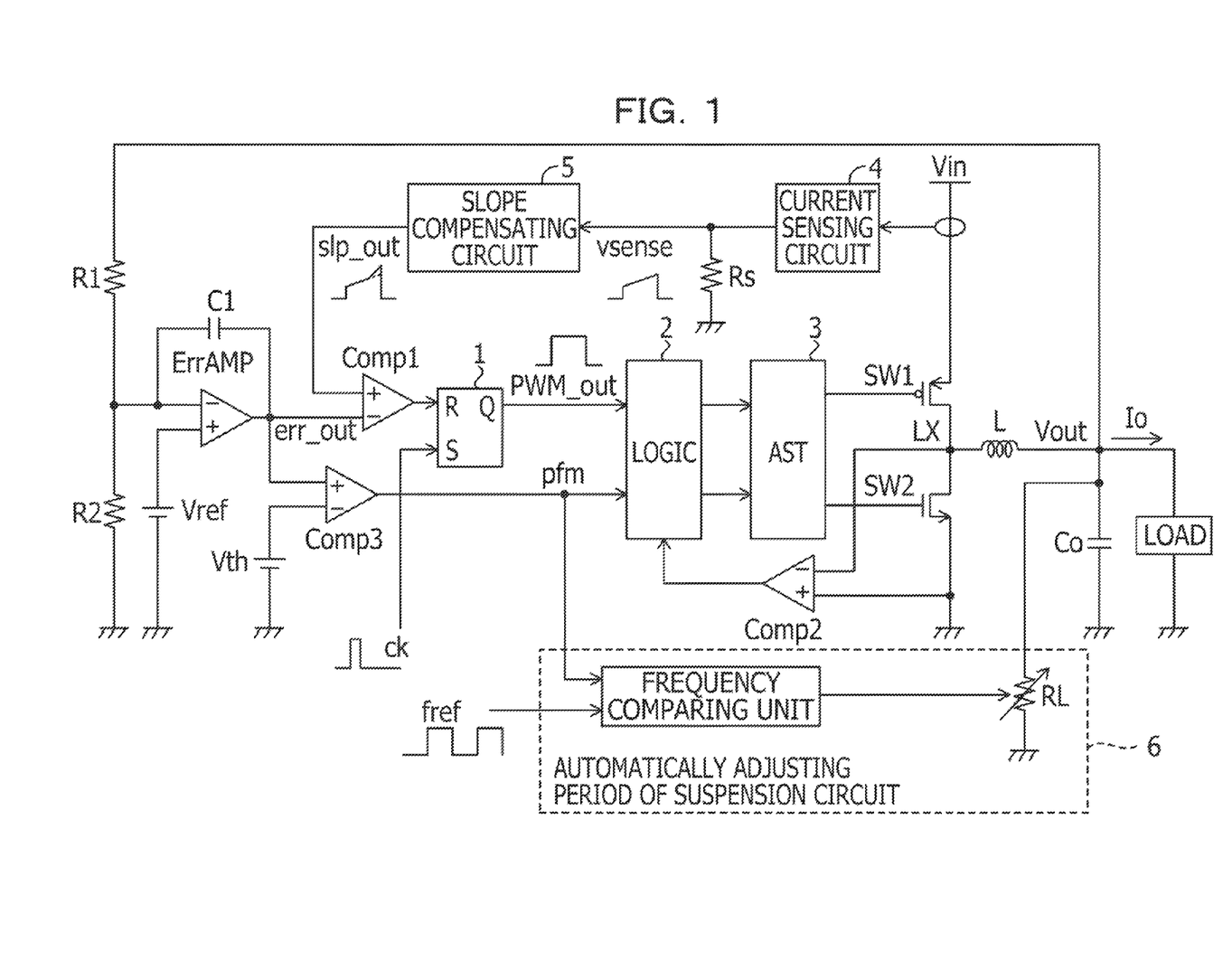
FIG. 1 illustrates an exemplary circuit.

FIG. 1 illustrates an exemplary circuit. An error amplifier ErrAMP amplifies a difference between a feedback voltage, which is obtained by dividing an output voltage Vout with resistors R1 and R2, and a reference voltage Vref. A phase compensating circuit may include a capacitor C1 coupled between an inverted input terminal and an output terminal of the error amplifier ErrAMP. An output err_out of the error amplifier ErrAMP is input to an inverted input terminal of a comparator Comp 1.

A current which flows through an inductor L is converted into a sensed voltage vsense by a current sensing circuit 4 and a sensing resistor Rs, and is supplied to a slope compensating circuit 5. The slope compensating circuit 5 may reduce oscillation which occurs when an on-duty ratio is 50 percent or higher. An output slp_out of the slope compensating circuit 5 is supplied to a non-inverted input terminal of the comparator Comp1, and is compared with the output err_out of the error amplifier ErrAMP.

Set and reset terminals of an RS flip-flop 1 are provided with a clock ck and an output of the comparator Comp 1, respectively. The RS flip-flop 1 outputs a PWM signal PWM_out. The PWM signal PWM_out is input to a gate of a switching element SW1 via a logic circuit 2 and an AST (Anti-Shoot-Through) circuit 3. The switching element SW1 may include a p-channel MOSFET, for example.

A switching element SW2 carries out a synchronous regulating operation. A comparator Comp2 compares voltages of both ends of the switching element SW2 with each other and provides the logic circuit 2 with a signal for stopping the switching element SW2, so that a reverse current may be reduced. The switching element SW2 includes, for example, an n-channel MOSFET. The AST circuit 3 may include a driver, and may reduce the switching elements SW1 and SW2 turning on contemporaneously or prevent the switching elements SW1 and SW2 from turning on contemporaneously.

The DC-DC converter controls the on-duty ratio of the switching element SW1 depending upon the output voltage Vout, steps down an input voltage Vin so as to produce the output voltage Vout, and supplies the load with the output voltage Vout.

Figure 2:
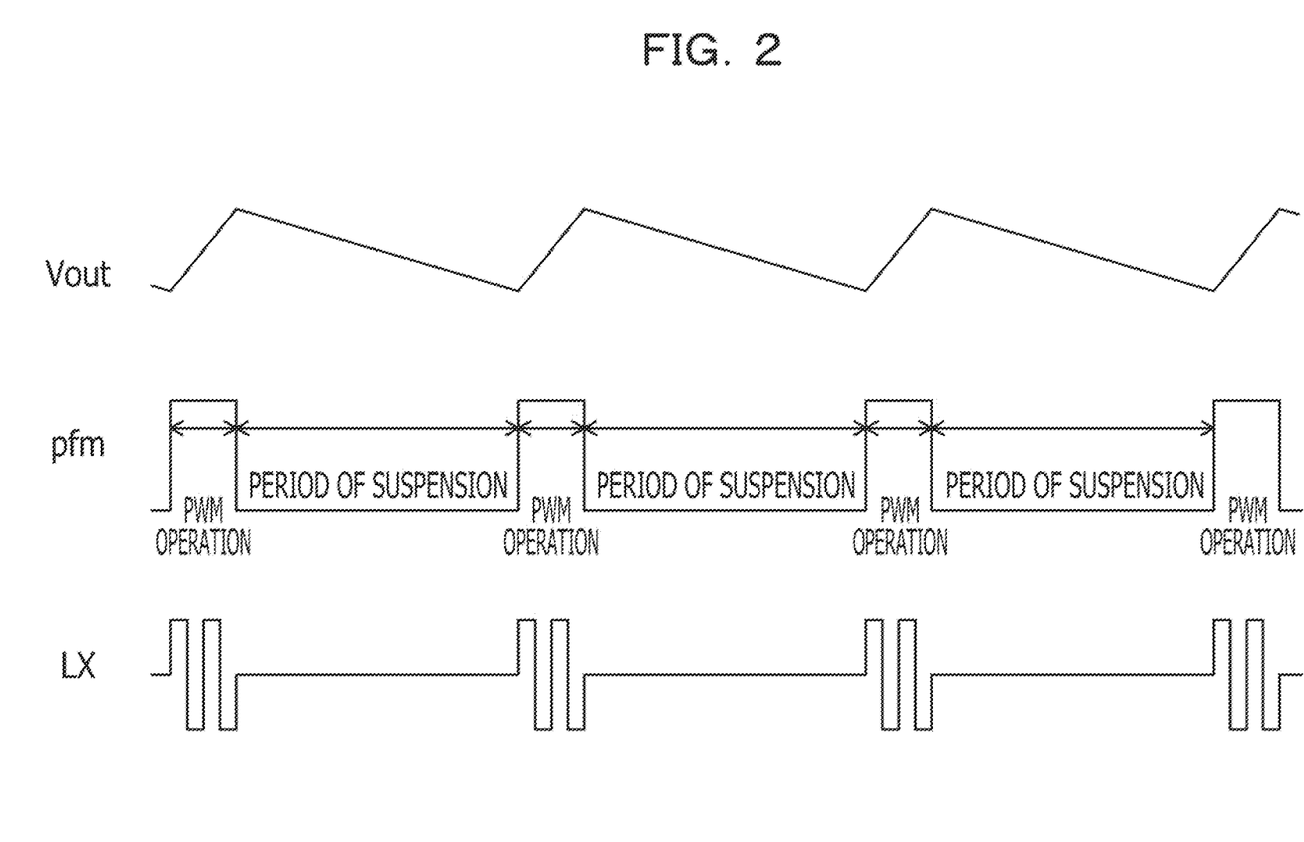
FIG. 2 illustrates an exemplary operation of a light load.

A comparator Comp3 compares the output err_out of the error amplifier ErrAMP and a threshold voltage Vth, so as to provide the logic circuit 2 with a signal pfm for stopping the switching operation of the switching element Sw1 or SW2. FIG. 2 illustrates an exemplary operation in case of a light load. FIG. 2 illustrates a PFM function as well. If, for example, the output voltage Vout increases, the output err_out of the error amplifier ErrAMP decreases. If the output err_out of the error amplifier ErrAMP becomes lower than the threshold voltage Vth, the output pfm of the comparator Comp3 turns from a high level to a low level. As illustrated in FIG. 2, the DC-DC converter carries out a PWM operation when the output pfm of the comparator Comp3 is at a high level and suspends the switching operation when the output pfm of the comparator Comp3 is at a low level. The PFM function reduces the increase of the output voltage Vout in case of a light load. A waveform LX may correspond to a voltage on a connection node between the switching elements SW1 and SW2 and the inductor L.

An inclination of the decrease of the output voltage Vout may be determined by an output capacitor Co and a load current Io. The inclination of the decrease of the output voltage Vout becomes small in case of a light load. As the inclination corresponds to the low frequency component, noise may occur in an audible range. The DC-DC converter includes an adjusting suspension period circuit 6 for adjusting a suspension period of the switching operation to a target cycle when the suspension period of the switching operation is extended. The adjusting suspension period circuit 6 compares a frequency fpfm of the output pfm of the comparator Comp3 and a reference frequency fref of a reference signal. For example, when the switching operation is suspended for a long time, the adjusting suspension period circuit 6 adjusts load resistors RL so that the frequency fpfm agrees with the reference frequency fref.

Figure 3:
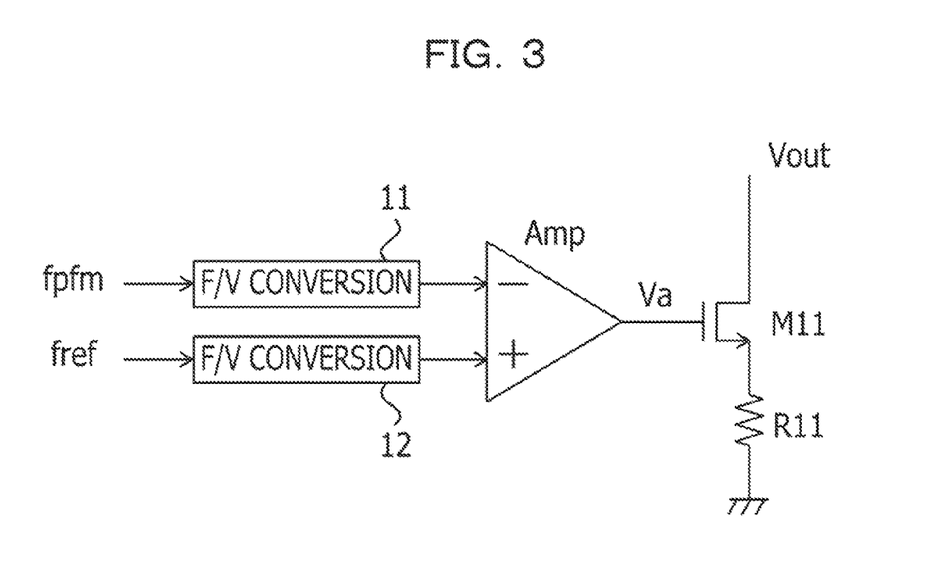
FIG. 3 illustrates an exemplary adjusting suspension period circuit.

FIG. 3 illustrates an exemplary adjusting suspension period circuit. An F/V converting circuit 11 converts the frequency fpfm of the output pfm of the comparator Comp3 into a voltage. An F/V converting circuit 12 converts the reference frequency fref of the reference signal into a voltage. An amplifier Amp controls a gate voltage of a transistor M11 depending upon a difference between the two F/V-converted signals. A drain of the transistor M11 is coupled to a supply line of the output voltage Vout, and a source of the transistor M11 is grounded via a resistor R11.

When an output voltage of the amplifier Amp is set to Va and a threshold voltage of the transistor M11 is set to Vth1, a current I which flows through the resistor R11 is denoted by I=(Va−Vth1)/R11. For example, when the frequency fpfm of the output pfm of the comparator Comp3 is reduced, the output voltage Va of the amplifier Amp increases. Therefore, the current I which flows through the resistor R11 increases. The load on the load resistors RL adjusted by the adjusting suspension period circuit 6 becomes heavy, and the DC-DC converter may shorten the suspension period of the switching operation. For example, when the frequency fpfm of the output pfm of the comparator Comp 3 grows, the output voltage Va of the amplifier Amp decreases. Therefore, the current I which flows through the resistor R11 decreases. When the load is heavy and the load current Io is large enough, the current I which flows through the resistor R11 becomes substantially zero, and the adjusting suspension period circuit 6 may not work during the suspension period of the switching operation. The adjusting suspension period circuit 6 may work when the frequency fpfm of the output pfm of the comparator Comp 3 becomes lower than the reference frequency fref of the reference signal so as to make the frequency fpfm match with the reference frequency fref.

Figure 4:
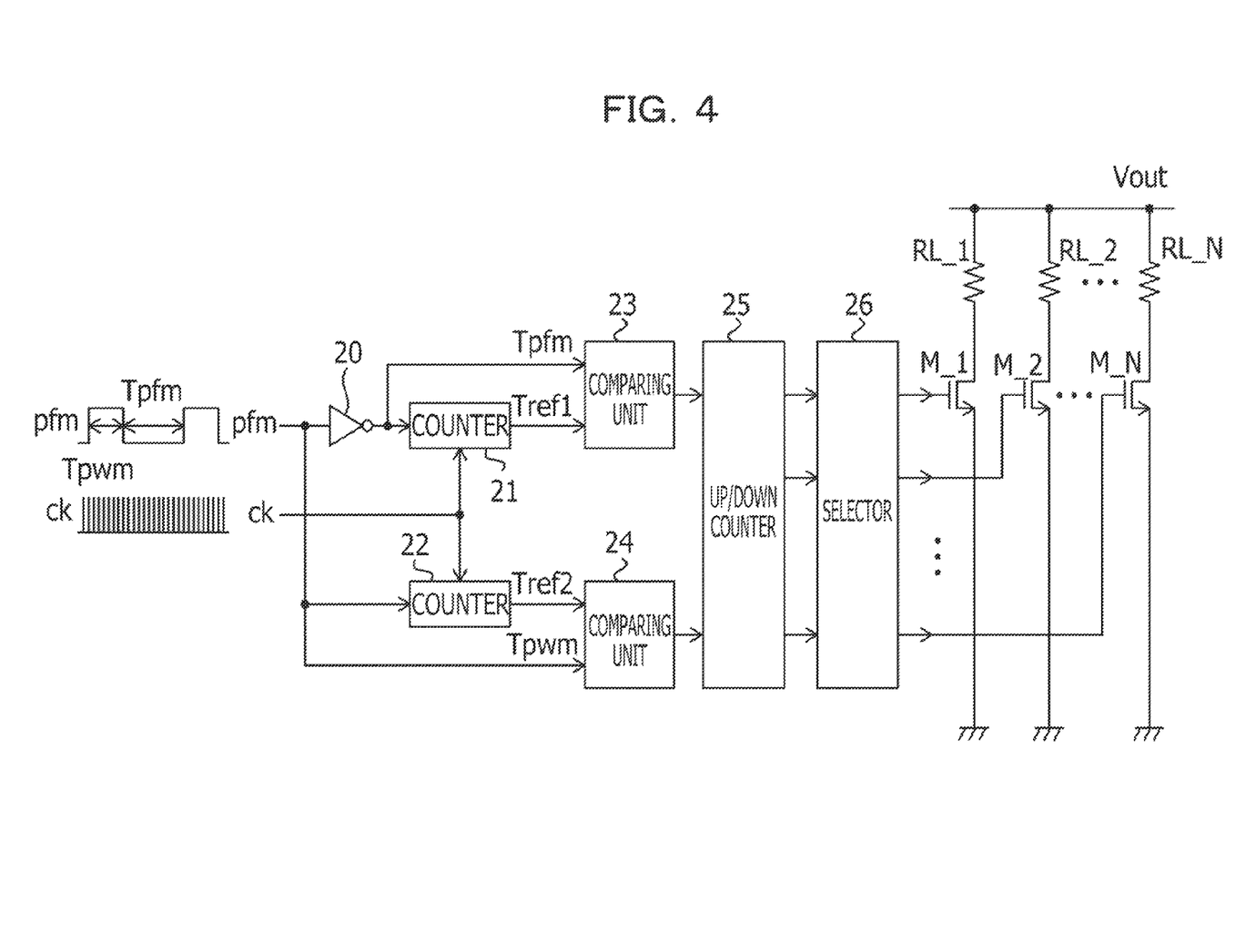
FIG. 4 illustrates an exemplary adjusting suspension period circuit.

FIG. 4 illustrates an exemplary adjusting suspension period circuit. The output pfm of the comparator Comp3 is input to a counter 21 and a comparing unit 23 via an inverter 20. When the output pfm of the comparator Comp3 is at a low level, the counter 21 counts in synchronization with the clock ck. When a counted value reaches a predetermined value Tref1, the counter 21 outputs a signal having a high level. The comparing unit 23 compares a period of time for which the output pfm of the comparator Comp3 is at a high level, for example, a suspension period Tpfm of the switching operation, with an output of the counter 21, such as a predetermined value Tref1, so as to provide an Up/Down counter 25 with a result of the comparison.

The output pfm of the comparator Comp3 is input to a counter 22 and a comparing unit 24. When the output pfm of the comparator Comp3 is at a high level, the counter 22 counts synchronously with the clock ck. When a counted value reaches a predetermined value Tref2, the counter 22 outputs a signal having a high level. The comparing unit 24 compares a period of time for which the output pfm of the comparator Comp3 is at a high level, for example, a period Tpwm of the PWM operation, with an output of the counter 22, for example a predetermined value Tref2, so as to provide the Up/Down counter 25 with a result of the comparison.

The Up/Down counter 25 counts up or down in accordance with the output of the comparing unit 23 or 24. A selector 26 selects at least one of transistors M_1, M_2, . . . , and M_N. The drains of the transistors M_1, M_2, . . . , and M_N are coupled to the supply line of the output voltage Vout via resistors RL_1, RL_2, . . . , and RL_N, respectively. The sources are grounded. The Up/Down counter 25 and the selector 26 turns the transistors M_1, M_2, . . . , and M_N on or off in accordance with the output of the comparing unit 23 or 24, so as to adjust the number N of the load resistors RL coupled in parallel.

Figure 5:
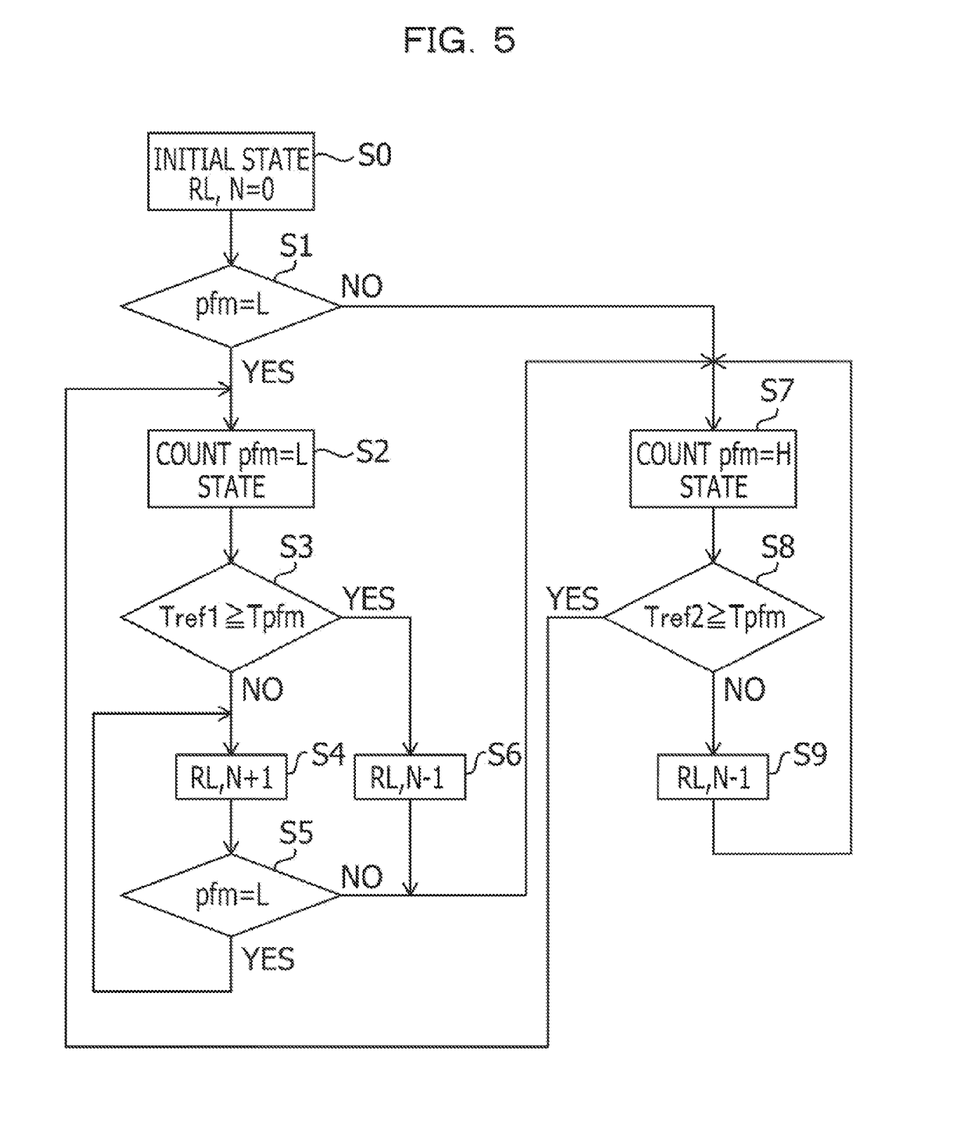
FIG. 5 illustrates an exemplary operation of an adjusting suspension period circuit.

FIG. 5 illustrates an exemplary operation of an adjusting suspension period circuit. The operation illustrated in FIG. 5 may be performed by the adjusting suspension period circuit 6 illustrated in FIG. 4. The number N of the load resistors RL coupled in parallel may be N=0 in an initial state (operation S0).

If the output pfm of the comparator Comp3 is at a low level (operation S1: YES), the counter 21 counts a period of an L-state (operation S2). When the output of the comparing unit 23 indicates that the suspension period Tpfm of the switching operation is longer than a predetermined value Tref1 which indicates a target period (operation S3: NO), the Up/Down counter 25 and the selector 26 increases the number N of the load resistors RL coupled in parallel by one (operation S4). When the output of the comparing unit 23 indicates that the output pfm of the comparator Comp3 is at a low level (operation S5: YES), the Up/Down counter 25 and the selector 26 increases the number N of the load resistors RL coupled in parallel by one (operation S4). When the output of the comparing unit 23 indicates that the output pfm of the comparator Comp3 is at a high level (operation S5: NO), the process proceeds to an operation where the output pfm of the comparator Comp3 is at a high level (operation S1: NO).

When the output of the comparing unit 23 indicates that the suspension period Tpfm of the switching operation is shorter than a predetermined value Tref1 that indicates the target period (operation S3: YES), the Up/Down counter 25 and the selector 26 decreases the number N of the load resistors RL coupled in parallel by one (operation S6). The process proceeds to an operation where the output pfm of the comparator Comp3 is at a high level (operation S1: NO).

If the output pfm of the comparator Comp3 is at a high level (operation S1: NO), the counter 22 counts a period of an H-state (operation S7). If the output of the comparing unit 24 indicates that the period Tpwm of the PWM operation is longer than a predetermined value Tref2 (operation S8: NO), the Up/Down counter 25 and the selector 26 decreases the number N of the load resistors RL coupled in parallel by one (operation S9). The counter 22 continues counting a period of the H-state (operation S7). The particular value Tref2 may be any value, and may be as many as ten cycles of the PWM period.

Meanwhile, when the output of the comparing unit 24 indicates that the period Tpwm of the PWM operation is shorter than a predetermined value Tref2 (operation S8:

YES), the process proceeds to an operation where the output pfm of the comparator Comp3 is at a low level (operation S1: YES).

Figure 6:
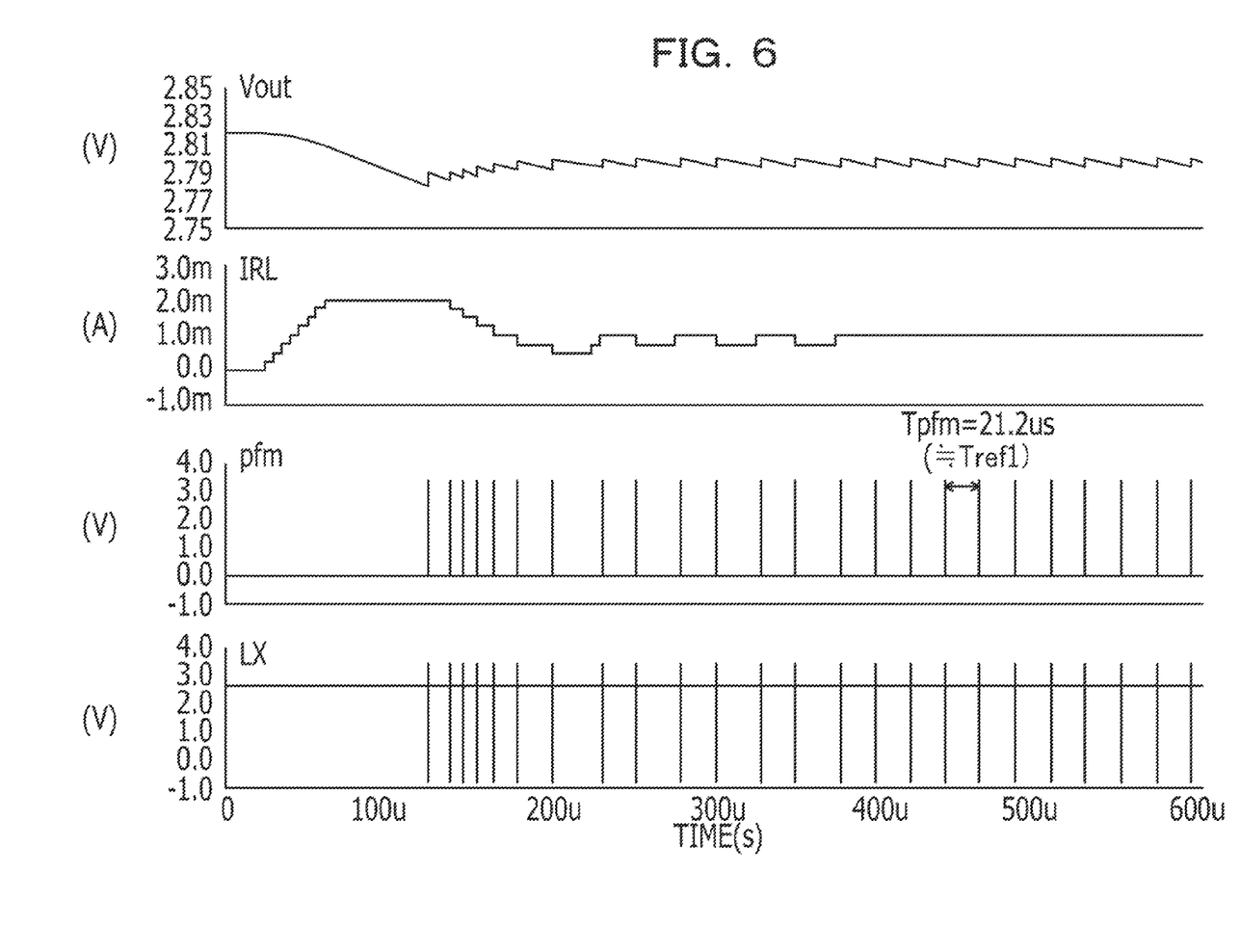
FIG. 6 illustrates an exemplary operation of an adjusting suspension period circuit.

FIG. 6 illustrates an exemplary operation of the adjusting suspension period circuit. The operation illustrated in FIG. 5 may be performed by the adjusting suspension period circuit 6 illustrated in FIG. 4. In FIG. 6, for example, the input voltage Vin may be set to 3.6V, the output voltage Vout may be set to 2.8V, the load current Io may be set to 0 mA (no load), a predetermined value Tref1 may be set to 21.333 μs (46.875 kHz), and the number N of the load resistors RL may be set to eight (8). In the adjusting suspension period circuit 6, as illustrated in FIG. 5, when the output pfm of the comparator Comp3 is at a high level, the counter 21 counts the period of the L-state, and the comparing unit 23 compares the counted value with a predetermined value Tref1, which indicates the target period. Because the load is light when the suspension period Tpfm of the switching operation is longer than a predetermined value Tref1, the adjusting suspension period circuit 6 increases the number N of the load resistors RL coupled in parallel until the suspension period Tpfm of the switching operation reaches a high level. As illustrated in FIG. 6, a current IRL which flows through the load resistors RL increases in a phased manner, and the inclination of the decrease of the output voltage Vout increases, for example, in a segment between 0 and 100 μs.

Then, because the load is heavy when the suspension period Tpfm of the switching operation is shorter than a predetermined particular value Tref1, the adjusting suspension period circuit 6 decreases the number N of the load resistors RL coupled in parallel, for example, by one. As illustrated in FIG. 6, the current IRL which flows through the load resistors RL decreases in a phased manner, and the inclination of the decrease of the output voltage Vout reduces, for example, in a segment between 100 and 200 μs.

In the adjusting suspension period circuit 6, as illustrated in FIG. 5, when the output pfm of the comparator Comp3 is at a high level, the counter 22 counts the period of the H-state, and the comparing unit 24 compares the counted value with a predetermined value Tref2. Because the load is heavy when the period Tpwm of the PWM operation is longer than a predetermined particular value Tref2, the adjusting suspension period circuit 6 decreases the number N of the load resistors RL coupled in parallel, for example, by one each time. When the load is heavy, the number N of the load resistors RL coupled in parallel may be zero.

The adjusting suspension period circuit 6 adjusts the number N of the load resistors RL coupled in parallel by repeating the above operation, so that the suspension period Tpfm of the switching operation is, for example, 21.2 μs as illustrated in FIG. 6. When the suspension period Tpfm of the switching operation is long in case of a light load, the adjusting suspension period circuit 6 performs a control operation so that the suspension period Tpfm of the switching operation converges on a predetermined value Tref1 which indicates the target period, i.e., Tpfm≈Tref1.

The adjusting suspension period circuit 6 illustrated in FIG. 3 monitors the frequency fpfm of the output pfm of the comparator Comp3. The adjusting suspension period circuit 6 illustrated in FIG. 4 monitors the suspension period Tpfm of the switching operation. As illustrated in FIG. 6, the suspension period Tpfm of the switching operation and the period Tpwm of the PWM operation may have a relationship such as Tpfm>Tpwm. The suspension period Tpfm of the switching operation may be monitored, and a cycle of the output pfm of the comparator Comp3 may be monitored. When the suspension period Tpfm of the switching operation and the particular value Tref1 have a relationship such as Tpfm=Tref1 at operation S3, as illustrated in FIG. 5, the process proceeds to operation 6, and the number N of the load resistors RL coupled in parallel is reduced by one. For example, the process proceeds to operation S4, e.g., and the number N of the load resistors RL coupled in parallel may be increased by one. When the suspension period Tpfm of the switching operation and a predetermined value Tref1 have a relationship such as Tpfm=Tref1 at the operation S3, the process may proceed to operation S7.

Figure 7:
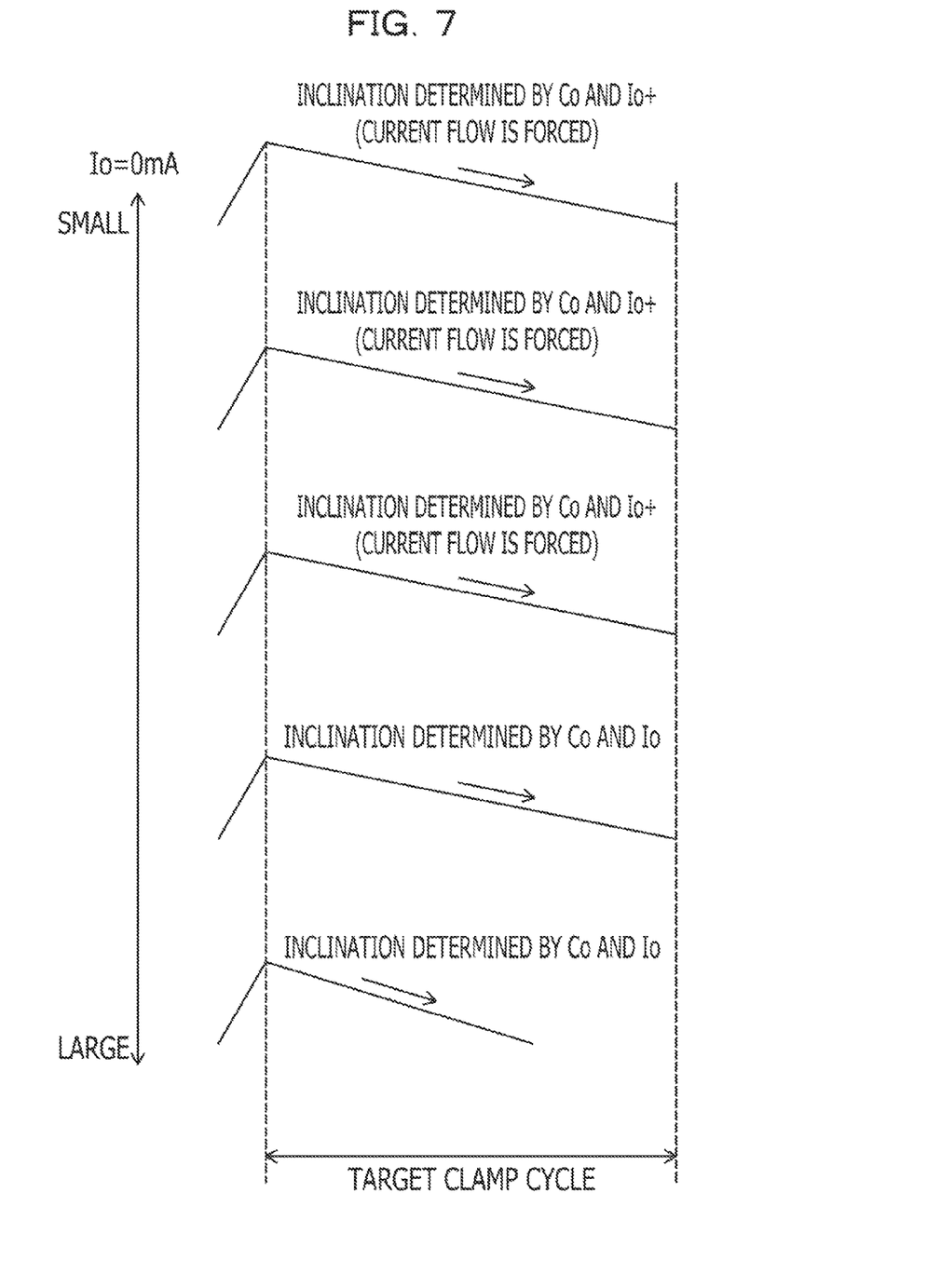
FIG. 7 illustrates exemplary output voltage waveforms.

FIG. 7 illustrates exemplary output voltage waveforms. The output voltage illustrated in FIG. 7 may indicate ripple waveforms of the output voltage Vout which appear after the adjustment of the suspension period of the switching operation. The adjusting suspension period circuit 6 of the DC-DC converter changes a resistance value of the load resistors RL based on the resistance value of the load resistors RL, which is changed in accordance with the suspension period of the switching operation. For example, as illustrated in FIG. 7, in case of a light load where the load current Io is small, an inclination of reduction of the output voltage Vout is adjusted. The ripple waveform of the output voltage may track a desired state where no low frequency component is included. If the load current Io is large enough and the suspension period of the switching operation is short, the current may not be subtracted more than is necessary.

For example, if the system supplied with power is an audio system, and the low frequency component included in the ripple waveform of the output voltage gets close to an audible frequency range, the low frequency component may appear as noise to the system. The low frequency component included in the ripple waveform of the output voltage is reduced in the period of suspension, and the frequency components included in the ripple waveform of the output voltage may be separated from the audible frequency range.

As the output voltage Vout tracks a desired state, the noise caused by the suspension period of the switching operation, in case of a light load, may be reduced.

An electronic device including the DC-DC converter described above, a battery which supplies the input voltage Vin, and a load which works upon being supplied with the output voltage Vout may be provided.

Example embodiments of the present invention have now been described in accordance with the above advantages. It will be appreciated that these examples are merely illustrative of the invention. Many variations and modifications will be apparent to those skilled in the art.

The invention claimed is:

1. A control circuit which switches a power supply circuit, comprising:
    a first control circuit to suspend a switching operation based on an output voltage of the switching power supply circuit; and
    a second control circuit to change a magnitude of a first load coupled to an output of the switching power supply circuit based on a suspension period of the switching operation,
    wherein the second control circuit changes the magnitude of the first load in a first suspension period so that the first suspension period substantially equals to a reference target cycle.

2. The control circuit according to claim 1, wherein the second control circuit includes:
    a first measuring circuit to measure the suspension period;
    a first comparing circuit to compare the suspension period with a first value based on a first measured value measured by the first measuring circuit;

a counter to count in accordance with an output of the first comparing circuit; and a selector to change the magnitude of the first load based on a count value counted by the counter.

3. The control circuit according to claim 2, wherein the second control circuit further includes:

a second measuring circuit to measure a switching period of the switching operation; and a second comparing circuit to compare the switching period with a second value based on a second measured value measured by the second measuring circuit, wherein the counter counts in accordance with the output of the first comparing circuit and an output of the second comparing circuit.

4. The control circuit according to claim 1, wherein the second control circuit includes:

a first F/V converting circuit to convert a frequency of an output signal of the first control circuit into a first voltage;

a second F/V converting circuit to convert a reference frequency of a reference signal into a second voltage;

an amplifier to amplify a difference between the first voltage and the second voltage; and a transistor for which a gate voltage is controlled based on an output of the amplifier.

5. The control circuit according to claim 1 further comprising, an error amplifier to receive a feedback voltage based on the output voltage; and a comparator to compare a threshold voltage and an output of the error amplifier and supply a comparison result to the second control circuit.

6. The control circuit according to claim 5, wherein the second control circuit adjusts the first suspension period based on the comparison result and a reference signal.

7. An electronic device comprising:

a switching power supply circuit;

a system to receive an output voltage of the switching power supply circuit; and a control circuit, wherein the control circuit includes;

a first control circuit to suspend a switching operation based on an output voltage of the switching power supply circuit; and a second control circuit to change a magnitude of a first load coupled to an output of the switching power supply circuit based on a suspension period of the switching operation, wherein the second control circuit changes the magnitude of the first load in a first suspension period so that the first suspension period substantially equals to a reference target cycle.

8. The electronic device according to claim 7 further comprising, an error amplifier to receive a feedback voltage based on the output voltage; and a comparator to compare a threshold voltage and an output of the error amplifier and supply a comparison result to the second control circuit.

9. The electronic device according to claim 8, wherein the second control circuit adjusts the first suspension period based on the comparison result and a reference signal.

10. A method which controls a switching power supply circuit, comprising:

determining a suspension period of a switching operation of the switching power supply circuit;

increasing a magnitude of a load coupled to an output of the switching power supply circuit when the suspension period of the switching operation is longer than a reference target cycle; and decreasing the magnitude of the load when the suspension period of the switching operation is shorter than the reference target cycle.

11. The method according to claim 10, further comprising:

measuring a switching period of the switching operation; and reducing the magnitude of the load when the switching period of the switching operation is longer than a second period.

12. The method according to claim 10 further comprising, receiving, by an error amplifier, a feedback voltage based on the output voltage;

comparing a threshold voltage and an output of the error amplifier; and adjusting the first suspension period based on a comparison result and a reference signal.

* * * * *